(12) United States Patent
Maclellan et al.

(10) Patent No.: US 9,672,545 B2
(45) Date of Patent: Jun. 6, 2017

(54) OPTIMIZING LICENSE USE FOR SOFTWARE LICENSE ATTRIBUTION

(75) Inventors: Scot Maclellan, Rome (IT); Bernardo Pastorelli, Rome (IT); Antonio Perrone, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1406 days.

(21) Appl. No.: 13/388,049

(22) PCT Filed: Jul. 16, 2010

(86) PCT No.: PCT/EP2010/060306
§ 371 (c)(1),
(2), (4) Date: Jan. 30, 2012

(87) PCT Pub. No.: WO2011/015441
PCT Pub. Date: Feb. 10, 2011

(65) Prior Publication Data
US 2012/0130911 A1    May 24, 2012

(30) Foreign Application Priority Data
Aug. 6, 2009  (EP) .................... 09167398

(51) Int. Cl.
*G06Q 99/00* (2006.01)
*G06Q 30/04* (2012.01)
(Continued)

(52) U.S. Cl.
CPC ............. *G06Q 30/04* (2013.01); *G06Q 10/06* (2013.01); *G06Q 30/06* (2013.01); *G06Q 50/184* (2013.01)

(58) Field of Classification Search
CPC  G06F 17/60; G06F 15/16; H04L 9/00; H04K 1/00; G06Q 30/04; G06Q 10/06; G06Q 30/06; G06Q 50/184
(Continued)

(56) References Cited

U.S. PATENT DOCUMENTS 5,905,860 A  5/1999 Olsen et al.
6,574,612 B1  6/2003 Baratti et al.
(Continued)

FOREIGN PATENT DOCUMENTS

JP  2001506794  5/2001
JP  2003323224  11/2003
(Continued)

OTHER PUBLICATIONS

Bearoya, Haym and Mi Han, Seon, "Probability Models in Engineering and Science." CRC Press, 2005.*
(Continued)

*Primary Examiner* — James D Nigh
*Assistant Examiner* — Margaret Neubig
(74) *Attorney, Agent, or Firm* — Zilka-Kotab, P.C.

(57) ABSTRACT

In one embodiment, a system for license management includes logic adapted for arranging entitlement slots under a plurality of licenses, each entitlement slot being configured for affording entitlement to use of an instance of a software application during a particular time frame, logic adapted for determining a license use signature from recorded license attribution information, logic adapted for receiving a notification of an instance not attributed to a license, and logic adapted for attributing the non-attributed instance to one of the plurality of licenses as a function of the license use signature, wherein each license has an entitlement value defining a maximum number of entitlement slots that may be attributed to that license during the time frame and any given (Continued)

instance of the software application may consume any number of the entitlement slots including zero entitlement slots.

10 Claims, 4 Drawing Sheets

(51) Int. Cl.
*G06Q 10/06* (2012.01)
*G06Q 30/06* (2012.01)
*G06Q 50/18* (2012.01)

(58) Field of Classification Search
USPC .................................. 705/50–79; 713/150
See application file for complete search history.

(56) References Cited

U.S. PATENT DOCUMENTS

| | | | | |
|---|---|---|---|---|
| 7,133,917 | B2* | 11/2006 | Re | G06F 21/121 709/217 |
| 7,406,593 | B2* | 7/2008 | Rabin | G06F 21/10 380/201 |
| 7,574,406 | B2* | 8/2009 | Varadarajan | G06Q 30/02 705/59 |
| 7,966,520 | B2* | 6/2011 | Walker | G06Q 10/10 714/13 |
| 8,229,858 | B1* | 7/2012 | Mazza | G06F 21/10 705/51 |
| 8,245,237 | B2* | 8/2012 | Tajima | G06F 9/4881 709/226 |
| 8,260,715 | B2* | 9/2012 | Bhogal | G06F 21/105 705/59 |
| 8,275,368 | B2* | 9/2012 | Braun | H04Q 3/0025 455/423 |
| 8,320,948 | B2* | 11/2012 | Li | H04L 5/0062 455/454 |
| 8,781,970 | B2* | 7/2014 | Boomershine | G06F 21/105 705/51 |
| 8,898,657 | B2* | 11/2014 | Demeyer | G06F 21/10 717/172 |
| 9,065,825 | B2* | 6/2015 | De Gaetano | H04L 63/0823 |
| 2001/0013024 | A1 | 8/2001 | Takahashi et al. | |
| 2004/0010471 | A1* | 1/2004 | Lenard | G06F 21/105 705/59 |
| 2009/0249494 | A1* | 10/2009 | Disciascio | G06F 21/10 726/31 |

FOREIGN PATENT DOCUMENTS

| | | |
|---|---|---|
| JP | 2004126642 | 4/2004 |
| JP | 2008003934 | 1/2008 |
| WO | 99/04354 A1 | 1/1999 |
| WO | 2008/049772 A3 | 5/2008 |
| WO | 2008/052820 A1 | 5/2008 |
| WO | 2011/015441 A1 | 2/2011 |

OTHER PUBLICATIONS

Benaroya et al. (Benaroya, Haym and Mi Han, Seon, "Probability Models in Engineering and Science". CRC Press, 2005).*
International Search Report and Written Opinion from PCT Application No. PCT/EP2010/060306 dated Oct. 7, 2010.

* cited by examiner

OPTIMIZING LICENSE USE FOR SOFTWARE LICENSE ATTRIBUTION

RELATED APPLICATIONS

This application claims priority to PCT Patent Application No. PCT/EP2010/060306, filed Jul. 16, 2010, and from European Patent Application No. EP09167398.8 filed on Aug. 6, 2009, which is herein incorporated by reference.

BACKGROUND

The present invention relates to license management, and more particularly, this invention relates to license management for software license attribution.

Software is generally protected by copyright law, and any use of software whose copyright is not the property of the user is dependent on a license from the copyright owner. Such licenses generally impose restrictions on the way in which the software may be used, in particular some items that may be restricted may include the number of concurrent users that may use the software on a given system at one time, the number of machines on which the software may be installed, etc.

Of course, payment is generally required for a license, and in some cases ongoing payments may be required depending on the extent and nature of the use of the software, particularly in how it relates to the restrictions. Still further, it may be possible to obtain alternative license terms in a case where use evolves over tune so that a particular license no longer satisfactorily covers the current or expanded use of the software. In enterprise environments with large numbers of users and machines on one hand, and a variety of different payment or royalty mechanisms on the other hand, the association of a particular license with a particular use may become increasingly complex. In such situations it is customary to provide license management software configured to monitor software usage.

Recent descriptions of license management software apply a number of different methods to associate software installation or use with the most appropriate of several valid licenses for the software in question. The objective of these methods is to optimise the use of licenses in order to remain compliant with the terms and conditions without having to over-procure and pay more for the use of the licenses than is necessary.

WIPO Publication No. WO0805280A1 discloses a method and a corresponding apparatus for controlling and metering usage of software products on a computer. When several licenses are available for the same product a method for determining the best license is proposed in order to maximize the exploitation of the licenses. Such a determination is based on a predetermined set of parameters which influence the selection of the best available license. The licenses are stored on a catalogue with an associated list of parameters indicative of usage constraints of the product. The licenses are ordered according to predetermined parameters optimization criteria, so that when a request is received, the license manager may easily find the best license, e.g., that license, suitable for the requested use, having the highest usage constraint. An additional feature is that the licenses are ordered according to one or more hierarchies, each hierarchy being ordered with respect to the other hierarchies according to predetermined priority rules.

This method, such as when two licenses have similar characteristics, applies a simple approach, trying to evenly distribute usage sessions between the licenses.

The disadvantage of all of these methods is that the choice is based on fixed rules, driven by an attempt to make the best choice. In real-world scenarios, the use of software may be very different from the logic assumed in the rules, and the method may make choices that lead to out-of-compliance or a non-optimized license use.

SUMMARY

In one embodiment, a system for license management includes logic adapted for arranging entitlement slots under a plurality of licenses, each entitlement slot being configured for affording entitlement to use of an instance of a software application during a particular time frame, logic adapted for determining a license use signature from recorded license attribution information, logic adapted for receiving a notification of an instance not attributed to a license, and logic adapted for attributing the non-attributed instance to one of the plurality of licenses as a function of the license use signature, wherein each license has an entitlement value defining a maximum number of entitlement slots that may be attributed to that license during the time frame and any given instance of the software application may consume any number of the entitlement slots including zero entitlement slots.

In another embodiment, a computer program product for license management includes a non-transitory computer readable storage medium having computer readable program code embodied therewith, the computer readable program code including computer readable program code configured for arranging entitlement slots under a plurality of licenses, each entitlement slot being configured for affording entitlement to use of an instance of a software application during a particular time frame, computer readable program code configured for determining a license use signature from recorded license attribution information, computer readable program code configured for receiving a notification of an instance not attributed to a license, and computer readable program code configured for attributing the non-attributed instance to one of the plurality of licenses as a function of the license use signature, wherein each license has an entitlement value defining a maximum number of entitlement slots that may be attributed to that license during the time frame and any given instance of the software application may consume any number of the entitlement slots including zero entitlement slots.

In yet another embodiment, a method for license management includes arranging entitlement slots under a plurality of licenses, each entitlement slot being configured for affording entitlement to use of an instance of a software application during a particular time frame, determining a license use signature from recorded license attribution information by determining a probability for each of the plurality of licenses that an arbitrary instance will be chargeable according to that license and determining for each of the plurality of licenses an average number of slots consumed per instance, wherein the license use signature represents typical license use patterns, receiving a notification of an instance not attributed to a license, and attributing the non-attributed instance to one of the plurality of licenses as a function of the license use signature, wherein each license has an entitlement value defining a maximum number of entitlement slots that may be attributed to that license during the time frame, and any given instance of the software application may consume any number of the entitlement slots including zero entitlement slots.

Other aspects and embodiments of the present invention will become apparent to the skilled person upon examination of the drawings and detailed description.

BRIEF DESCRIPTION OF THE SEVERAL VIEWS OF THE DRAWINGS

Embodiments of the present invention will now be described by way of example with reference to the accompanying drawings in which like references denote similar elements, and in which.

DETAILED DESCRIPTION

Figure 1:
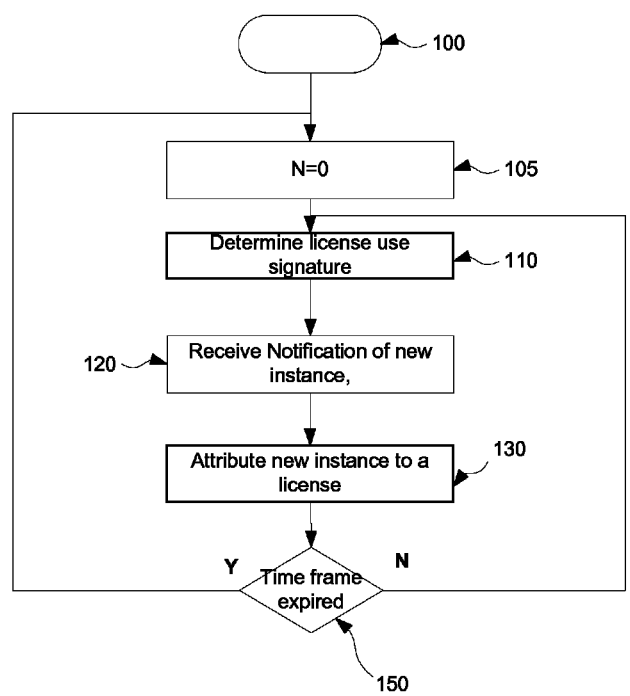
FIG. 1 is a schematic representation of the method steps of a first preferred embodiment of the present invention.

In order to more efficiently deal with the problems of currently used license management techniques, a method to dynamically select the best applicable license for a given instance of an act; (such as miming an instance of an application, program, etc.) may be used, according to one embodiment, so that when an application starts, the best licenses, at the time the application is started, may be assigned to the application. During the lifetime of the application, the best license may change or the used license can be no longer applicable. For example, a license which was in use at the time the application was started may be released at a certain time, so it becomes the best available license after the application was started. In another example, the original license may no longer be used because it is changed in some way, for example by adding additional limitations or restrictions to it, such that it is no longer applicable to the operating system (OS) the application is running on. According to another example, something may change in the hardware configuration or the organizational hierarchy, the OS hosting the application may be moved from one department to another department, thus making the original license no longer applicable or making another license the best available one, the hardware hosting the OS where the application is running may be upgraded (without stopping the application) thus making the license no longer applicable.

The examples presented above are simple examples of a change to the license properties, hardware (i.e., resource) properties, properties of the organization (i.e., group properties) or properties of the link between any of these entities. These changes may result in another license becoming the best license to assign.

An embodiment is described hereafter in the context of a complete license interpretation system, although it is to be appreciated that embodiments described herein may equally be implemented in simpler, more complicated or otherwise different environments, or even as an entirely stand-alone solution.

Organizations are generally divided into hierarchies representing geographical or organizational divisions of an enterprise or business. Licenses may be acquired or assigned at different levels of these hierarchies. For this reason these hierarchies may preferably be taken into account when deciding which is the best license to assign to an instance of an application.

In one example, a license interpretation system may accept the following input: An abstraction of the licensee organization based on hierarchies: one hierarchy may be a geographical grouping (continent, region, state, city, etc.), while another hierarchy may be an organizational grouping (development lab, code development team, Java development department, etc.) A set of group hierarchies (where each group is differently divided) may be defined. Each hierarchy has its own identifier, which makes it possible to distinguish the groups that are part of each hierarchy apart from one another. A group in a hierarchy may have a parent in the same hierarchy and may be linked (as a child) to at most one group of other hierarchies at any point in time and/or level of the hierarchy. The hierarchy identifiers generate a ranking of the hierarchies: a group in one hierarchy may be associated (as a child) only to groups of hierarchies of higher rank, in one approach.

Another hierarchy may include virtualization layers, where each node is a root of such hierarchies, and its child may be, for example, shared pools, Logical Partitions (LPARs), virtual machines (VMs), OSs, containers (as provided by IBM WEBSPHERE), etc. IBM and WebSphere are registered trademarks of IBM Corporation in the United States, other comities, or both). Each member of such hierarchies is a resource. A resource is linked to its parent resource (the roots being nodes) and may also be linked to at most one group of each group hierarchies. A resource may have one parent and be linked to one group of each hierarchy at any given point in time, meaning that at two different times, it may have two different resource parents or linked groups in the same hierarchy, according to one approach.

Every link between resources, groups, and/or resources and groups may be tagged with a validity time interval in such a way that, for example, the department license manager may be part of the development lab during a first period of time and may be moved, for example, to the research lab during a second period of time. In another example, an OS may have been hosted on a first machine A for a first period of time and then may be moved to machine B for a second period of time, for example to upgrade the machine on which the OS is running.

Each resource or group may be associated with certain properties, according to one embodiment. The properties may depend on the ability of the licensing system to retrieve useful data about each entity. For example, the number of processors of a node, the amount of memory of an operating system, the number of employees in a department, or any other useful information may be used. These properties may be collected in one approach because a pricing model may potentially use them for computing how much a license has been used (for example, certain licenses require capacity information at each level of the virtualization hierarchy to compute software usage).

Another possible input of the algorithm is the set of users known to the licensing system. These users are the ones installing or executing software and can also be used to limit license consumption only to a subset of the enterprise employees. Each user can be tagged with additional properties, describing any attribute of the user the licensing system is able to retrieve and which can be useful to some pricing model for license computation.

Still another possible input is a set of licenses, each one associated to one pricing model supported by the licensing system. Each license may be potentially divided into multiple distributions, i.e., divisions of the license entitlement, each one associated to different subjects allowed to use the license. Each distribution has a set of targets allowed to use this distribution (being them groups or resources) and for each of these targets one or more association validity intervals are provided meaning that the targets are allowed to use the license only in these time intervals. Also, each distribution may be associated with all the users or a subset of them, thus limiting the users which can use it. Again, each of these associations are augmented with one or more time intervals, detailing the association validity.

Countless variations in license terms may be used, for example: a license usable to any employee in the Development lab (the target is the group representing the Development lab, while there are no user limitations); a license usable to any employee in Italy (the target is the group representing the geographical location Italy as there are no user limitations); a license usable only on a particular hardware system (such as on a particular PC), where the target is the resource representing the particular hardware, while there are no user limitations: a license usable only by a named user as the target is the whole enterprise, but there is a user limitation, associating the license only to one user.

Of course, each license and distribution has associated properties which are values entered by the user when defining the license and the distribution, and required by the pricing model associated to the licenses for computing license usage and compliance. Examples of these are the number of processors the application is executed or multiple numbers for licenses such as tier licenses, where each number is for a different hardware tier and so on.

To ensure a good association of usage to license, the licensing system supports the concept of non-consuming licenses: a license (or pricing model) may be flagged as not consuming if the user has to pay the same amount for the license independent of the amount of software usage. For example, a site license for a given product for the use of a particular development group is a good example of a non-consuming license: the lab pays for the license when acquiring it and once paid, the lab may use that product as often as desired without the need to pay additional fees and without risking overuse of the license. If such a license is available for a product, it is considered as a preferred license because use may be associated to it without risking overuse or the need to pay additional fees (such as in pay-per-use licenses).

The license interpretation system according to one embodiment executes the following operations 1-6:

1. Navigate the resource and group hierarchies, starting from the resource which originated the software usage, extracting the set of license distribution reachable from that resource in each time interval and associated to the product generating the consume session, that is, the instance of the software for which it may be necessary to associate a usage slot.

The resource hierarchy is the first one to be visited. The parent of each resource is visited after the resource itself. In case of multiple parents, they may be visited in time order (but this is not strictly required for the correctness of the algorithm). While visiting the resources, the algorithms collect the list of groups reachable from each resource. After completing the visit of the resource hierarchy, the algorithm moves to the group hierarchies starting from the ones with lower rank (i.e., highest ID). During the visit, a reachable time interval may be maintained.

2. Select the validity time of each license based on user limits. If the license (or distribution) has no user limits, it may be associated to the consume session at any time. Otherwise, the license (or distribution) cannot be associated in the time periods where the consume session user is not associated with the license (or distribution). This operation may be performed before operation 1, since the two are independent.

3. For all the licenses (or distributions) which may be associated with the consume session, determine if the pricing model allows for the session to be assigned and in what time intervals. There are some pricing models which impose additional constraints on consume sessions to be associated, such as pricing models which allows a consume session to be associated with a license (or distribution) only if a specified second product is also installed on the machine; otherwise the license cannot be used. So the association is possible only during the time intervals where the referenced product is also installed on the machine.

4. Once the algorithm has obtained the list of licenses associable to a consume session with the related time intervals, the algorithm prefers non-consuming licenses.

5. If no valid license is found, based on the target constraints, the algorithm searches for licenses (or distributions) marked as "default" and reachable from the root of all the hierarchies within the time interval for reach ability. The nearest license (or distribution) associated to the product originating the consume session is considered as the first one valid for the association.

6. If more than two licenses (or distributions) are obtained for a given time interval (because two of them are associated to the same resource or group) the algorithm prefers installation licenses (or distributions) over usage licenses (or distributions).

It will be understood that other methods of automatically interpreting, selecting and applying license terms as may occur to the skilled person are equally compatible with the embodiments described herein.

A license management system seeks to evenly distribute usage sessions between the licenses, without consideration of the expected consumption for each license. However, embodiments described herein are based on the realization that the license management system already has a database that includes software inventory and use information. The data may date back several months, or even years. Recent historical data is a good indicator of typical use patterns, and it may be assumed that software use on any particular day is likely to match the pattern observed in the past week, 2 weeks, or any other appropriately recent period. The license management system uses the knowledge about how many software instances are typically used in the various branches of the organization, and what that means in terms of license use for the licenses that are applicable to any particular piece of software, to be able to distribute current use among the licenses in an optimized fashion, choosing the most appropriate license for each use in order to optimize use of most 'convenient' license and ensure that none of the licenses go into non-compliance.

Accordingly, if there are two installation or usage licenses (or distributions), or if it is necessary in any other context to choose between two licenses, the algorithm uses historical usage data to determine which is the best license to use. This logic is based on statistical indicators derived from the data the system accumulated over time. Accordingly, there is provided a method of attributing entitlement slots under a plurality of software licenses potentially affording rights to a particular piece of software or application to instances of this piece of software or application during a particular time frame, where each license has an entitlement value (E) defining the maximum number of entitlement slots that may be attributed to that license during this time frame. This method may include the steps of:

determining a license use signature from recorded license attribution information receiving a notification of an instance not yet attributed to a license; and attributing the new instance to one of said licenses as a function of said License use signature.

Preferably, the model represents typical license use patterns, and the method attributes the new instance to the most convenient of the licenses while ensuring compliance with terms of all the licenses.

The time frame may be one or more hours, days, weeks, etc., or any other period as defined in the licenses being used. If desired, the time frame may be a fraction of the period defined in the license. Slots may be distributed amongst time frames, and unused time frames passed to later time frames within the same license period. The time frame may be chosen as the lowest common denominator of the period of the various licenses applicable to the same software, in one approach.

For the purposes of the following example, it is assumed that there exists a plurality of licenses covering the same software or application from a functional point of view. Each of these licenses defines a number of entitlement slots (E) that may be consumed in a given day, where each entitlement slot corresponds to executing the software once on a single processor, that is, one software instance. Where the same software is run once on a multiprocessor system, the number of entitlement slots consumed may be multiplied by the number of processors in that system. That is, the number of entitlement slots consumed by a particular instance may depend on the number of processors on which the instance is executed. Certain licenses may require that an entitlement slot be consumed only for the first execution in a given day, any following executions attributed to the same license simply falling into the same entitlement slot. Naturally a vast range of variations and permutations along these lines may be envisaged.

The following values may be considered:

$dC$=for a given license, the total number of entitlement slots consumed on a particular day, as determined from historic use data.

$dN$=for a given license, the number of charging software instances attributed to that license on a particular day. A charging software instance is an instance which results in the consumption of at least one entitlement slot.

$dL$=for a given license, the number of software instances attributed to that license on a particular day. This value takes into account all attributed instances, whether they result in the consumption of entitlement slots or not.

It is understood that for a given license, $dN$ will always be less than or equal to $dL$.

Day d-2:

| license 1 (E = 4) | license 2 (E = 10) |
|---|---|
| 2 | 2 |
| 0 | 2 |
|  | 3 |
|  | 1 |
| dC = 2 | dC = 8 |
| dN = 1 | dN = 4 |
| dL = 2 | dL = 4 |

Day d-1:

| license 1 (E = 4) | license 2 (E = 10) |
|---|---|
| 2 | 4 |
| 0 | 2 |
| 0 |  |
| 0 |  |
| dC = 2 | dC = 6 |
| dN = 1 | dN = 2 |
| dL = 4 | dL = 2 |

From historical information as shown by way of example in the preceding tables for day d-1 and d-2, a value C is calculated, where $C=AVG(dC/dN)$, the average of the ratio between how much a license is consumed and the number of consuming instances. This value represent the average consume of a software or application instance with a non-zero contribution $S=AVG(dN/dL)$, the average of the probability that a software instance associated to a license has a non-zero effect on the license consumption.

Day d-2:

| license 1 (E = 4) | license 2 (E = 10) |
|---|---|
| dC = 2 | dC = 8 |
| dN = 1 | dN = 4 |
| dL = 2 | dL = 4 |
| dC/dN = 2/1 = 2 | dC/dN = 8/4 = 2 |
| dN/dL = 1/2 | dN/dL = 4/4 = 1 |

Day d-1:

| license 1 (E = 4) | license 2 (E = 10) |
|---|---|
| dC = 2 | dC = 6 |
| dN = 1 | dN = 2 |
| dL = 4 | dL = 2 |
| dC/dN = 2/1 = 2 | dC/dN = 6/4 = 3/2 |
| dN/dL = 1/4 | dN/dL = 2/2 = 1 |

Average Values:

| license 1 (E = 4) | license 2 (E = 10) |
|---|---|
| C = (2 + 2)/2 = 2 | C = (2 + 3/2)/2 = 7/4 |
| S = ((1/2) + (1/4)) = 3/8 | S = (1 + 1)/2 = 1 |

Turning now to day d, that is, "today," a partially complete day for which license attribution optimization, according to embodiments presented herein, is implemented.

$R(n)=E-N \times C \times S$ is the average residual capacity after n instances have been assigned to the license.

Day d:

| license 1 (E = 4) | license 2 (E = 10) |
|---|---|
| 4 | 4 |
| C = 2 | C = 7/4 |
| S = 3/8 | S = 1 |
| N = 4 | N = 4 |
| R = 4 − (4 × 2 × (3/8)) = 4 − 3 = 1 | R = 10 − (4 × 7/4 × 1) = 10 − 7 = 3 |

As shown above, so far 4 slots of each license have been attributed to each license. When a further consuming instance is detected, it is determined to which license it should be attributed by reference to the historical values calculated as described above. Specifically, when the system chooses among two or more licenses, it assigns an instance to the license with the lower C and an R higher than 0, in one approach.

In the present example, both licenses have an R higher than 0, but license 1 has the lower value of C, so that the next consuming instance is attributed to license 1.

According to certain embodiments described herein license 2 may be used until there are R available ((7/4)*3=5 instances), after which license 1 may be used even though it has a higher C.

Accordingly, the step of determining a license use signature may comprise the steps of determining from recorded license attribution information a probability for each said license that an arbitrary instance will be chargeable according to that license (C), and determining from recorded license attribution information for each said license an average number of slots consumed per instance (S). The step of attributing may comprise the steps of: attributing the new instance to whichever license has the lowest probability that an arbitrary instance will be chargeable according to that license (C), and where the probability for that license that a new instance will be chargeable according to that license (C) multiplied by the average number of slots consumed per instance (S) for that license multiplied by the number of number of instances already attributed to that license during the present time frame (I) is less than the entitlement value for that license.

Still further, the probability for each license that an arbitrary instance will be chargeable according to that license (C) is preferably calculated as the average across all time frames in the historical record of the ratio between the number of slots consumed on each time frame comprised in the historical record (dC) and the number of instances to which slots are attributed in that same time frame (dN).

The average number of slots consumed per instance (S) is preferably calculated as the average across all time frames in the historical record of the ratio between the number of instances to which slots are attributed in each time frame (dN) and the total number of instances with that license in the same time frame (dN).

If the number of instances assigned to a particular license exceeds its Entitlement value (E), the system's use is improper. One way of preventing this situation may be to impose a hard limit, such that the license attribution system may not attribute instances to licenses that have reached their entitlement limit. This may however lead to the impossibility of assigning any license, or prevent the software from running altogether.

An alternative, which results in a more graceful handling of licenses in high demand, calls for the application of a protection threshold P to the entitlement giving E=E*P/100). In this way, a safety margin is built into the calculation to avoid overloading a particular license. Accordingly, the respective entitlement value (E) may be multiplied by a predefined protection threshold value (P) such that the entitlement value (E) becomes less than the strict maximum defined by each license.

It will be noted that the values chosen in the foregoing example very small, for the sake of simplicity, for which it would in any case be a simple matter to identify the most appropriate license without recourse to embodiments described herein. It will be appreciated that the embodiments described herein become increasingly useful as the number and complexity of licenses and usage instances increases.

In this way, the association of software use to the most appropriate license, based on a knowledge of how the organization actually uses the software is improved, and the risk of making a non-optimized choice is thereby reduced.

Furthermore, association between software usage and licenses justifying that usage may be provided in the presence of complex organizational and virtualization hierarchies, while maintaining a method general enough to support very different pricing models. The license association logic should maximize the usage of existing licenses and avoid each of them to reach overuse (e.g., usage greater than the entitlement level).

FIG. 1 is a schematic representation of a method according to one embodiment. The method allows handling of complex organizational structures and virtualization hierarchies by preferring non-consuming licenses over consuming licenses, thus optimising the license association. It also allows license use signature specific constraints to be included in the association processing, thus supporting different pricing models and their constraints.

This approach may be extended to product hierarchies by considering all the licenses associated not to the product originating the consume session, but to all the products in the hierarchy of the consuming one, in one approach.

The method of ordering the preferred licenses according to a mix of their distance from the consuming resource and the relative order of hierarchies is just one of several possibilities. One alternative may to combine all the attributes, such as with a relative weight, and calculating a global "preference value" for each license.

As shown in FIG. 1, the method starts at step 100 at the beginning of a new time frame, and proceeds to step 105; at which the value N is set to zero for each license. As described above, N is the number of slot consuming instances to which slots are attributed in a given time frame, and accordingly is set to zero at the start of a new time frame. The method next proceeds to the step 110, whereupon a license use signature is determined from recorded license attribution information. The method then awaits a notification of an instance not yet attributed to a license, which is received at step 120, upon which the method proceeds to step 130 at which the new instance is attributed to one of the licenses as a function of the License use signature generated at step 110. At step 150 the method then determines whether the end of the time frame has been reached, or not. In a case where the end of the time frame has been reached the method returns to step 105, and N is reset to 0, otherwise the method returns to step 110, at which the license use signature is updated to reflect the new usage situation.

Figure 2:
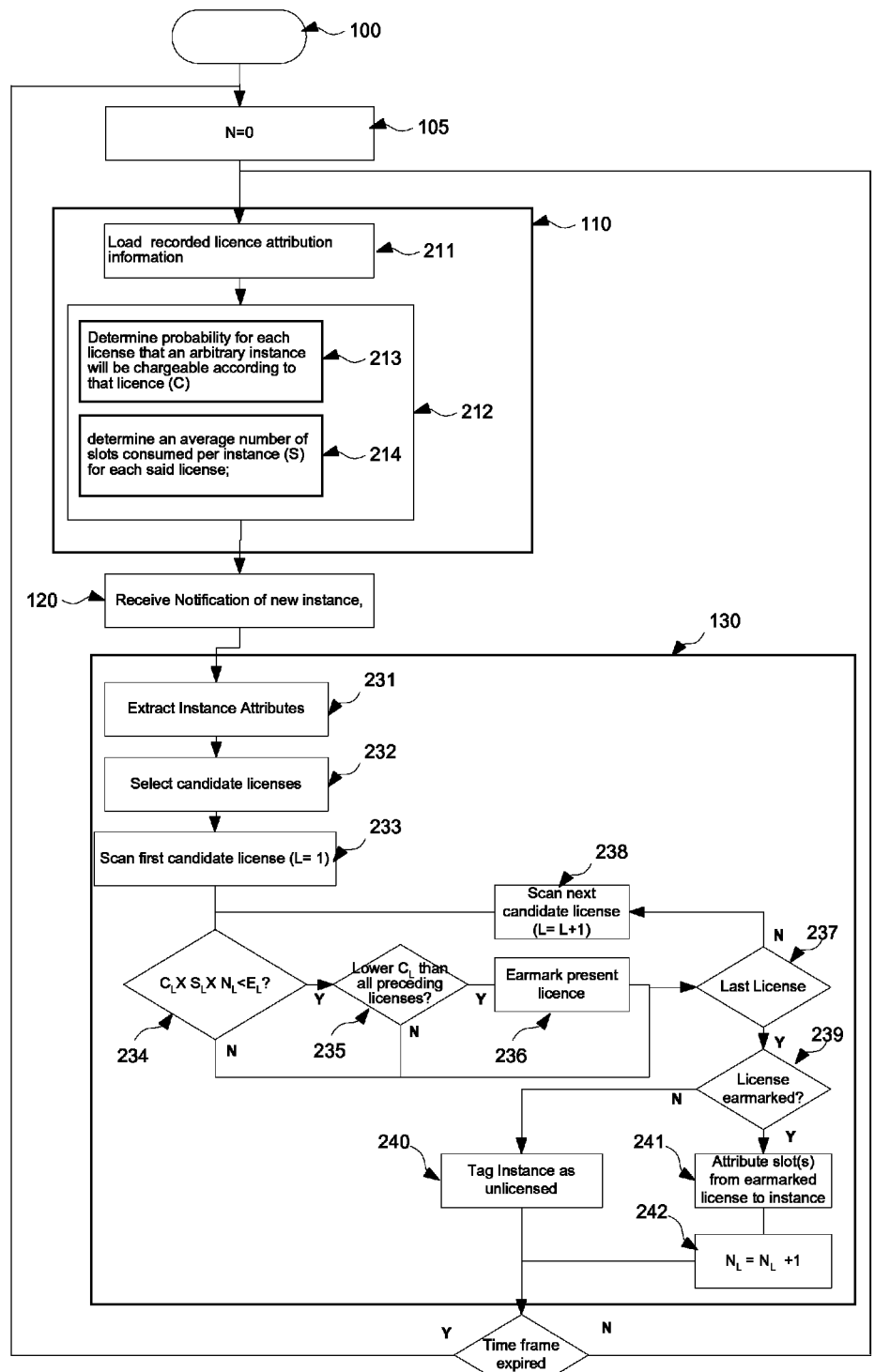
FIG. 2 is a schematic representation of the method steps of a second preferred embodiment of the present invention.

FIG. 2 is a schematic representation of the method steps of a second preferred embodiment of the present invention. The embodiment of FIG. 2 comprises the same basic steps 105, 110, 120, 130, 150 as described above with respect to FIG. 1, with further optional sub-operations or sub-steps being provided within the steps 110 and 130. In particular, according to the embodiment of FIG. 2, the step 110 of determining the license use signature starts at sub-step 211 of loading license-attribution information. The method then proceeds to sub-step 213 of determining from the recorded license attribution information a probability for each license that an arbitrary instance will be chargeable according to that license, a value which is accorded a symbol (C). The method next proceeds to step 214 of determining from the recorded license attribution information for each license of the plurality of licenses an average number of slots consumed per instance, which is accorded a symbol (S). These two steps may of course be carried out in any order, or in parallel.

Meanwhile, in accordance with this second preferred embodiment, the step of attributing 130 starts with the sub-step 231 of extracting instance attributes. Instance attributes may include information identifying the software or application being instantiated, a user, an environment in which the software or application is being instantiated and/or any other information useful to identify suitable licenses providing rights covering the instantiated software or application as described herein.

Based on this information at step 232 the method proceeds to select candidate licenses providing rights covering the instantiated software or application, from which the optimum or best license to attribute to the new instance is selected, in one approach. At step 233 the method selects the first candidate license, L=1. At step 234 it is determined whether the probability for the presently selected candidate license that a new instance will be chargeable according to that license (C) multiplied by the average number of slots consumed per instance (S) for that license multiplied by the number of instances already attributed to that license during the present time frame (I) is less than the entitlement value (E) for that license, i.e., $E>C*S*I$. If the entitlement value (E) is greater than this calculated value, i.e., $C*S*I$, the method proceeds to step 235 at which it is determined whether the probability that an arbitrary instance will be chargeable according to the presently selected license (C) is the lowest of the candidate licenses yet reviewed. If it is, the license is earmarked as the strongest candidate so far reviewed at step 236, before proceeding to step 237.

In a case whether either the test of step 234 or 235 fails, the method proceeds directly to step 237. In any case at step 237 the method determines whether the license presently under review is the last of the candidate licenses or not. If not, the value of L is incremented by one at step 238, thereby proceeding to the review of the next candidate license from step 234 as described above. If the license presently under review is determined to be the last candidate license, the method proceeds to step 239 at which it is determined whether a license has been earmarked as suitable or not.

If a license has been earmarked as suitable, the method proceeds to step 241 at which the slots required by the new instance are attributed to the earmarked license. The method then increments N at step 242 before reaching step 150 as described herein. In a case where no license has been earmarked, the method proceeds to step 240 where the instance is flagged as unlicensed.

Optionally, in one approach, this may lead to the instance being terminated or refused resources. Alternatively notifications may be transmitted for example by email, etc., to appropriate personnel of the organization running the instance or the method, such as IT staff, procurement staff, etc. Still further, a mechanism able to request an exception or emergency rights may be automatically put into operation, in another approach. The reaction may depend on the nature of the software or application itself, for example, as determined from the attributes collected at step 231. In one example, if the instance is determined to relate to critical operations, the instance may be allowed to proceed unlicensed or under emergency conditions. The method then proceeds reaching step 150 as described herein.

In a case where a number of equal candidates are identified, other criteria may be used as tie breakers.

Figure 3:
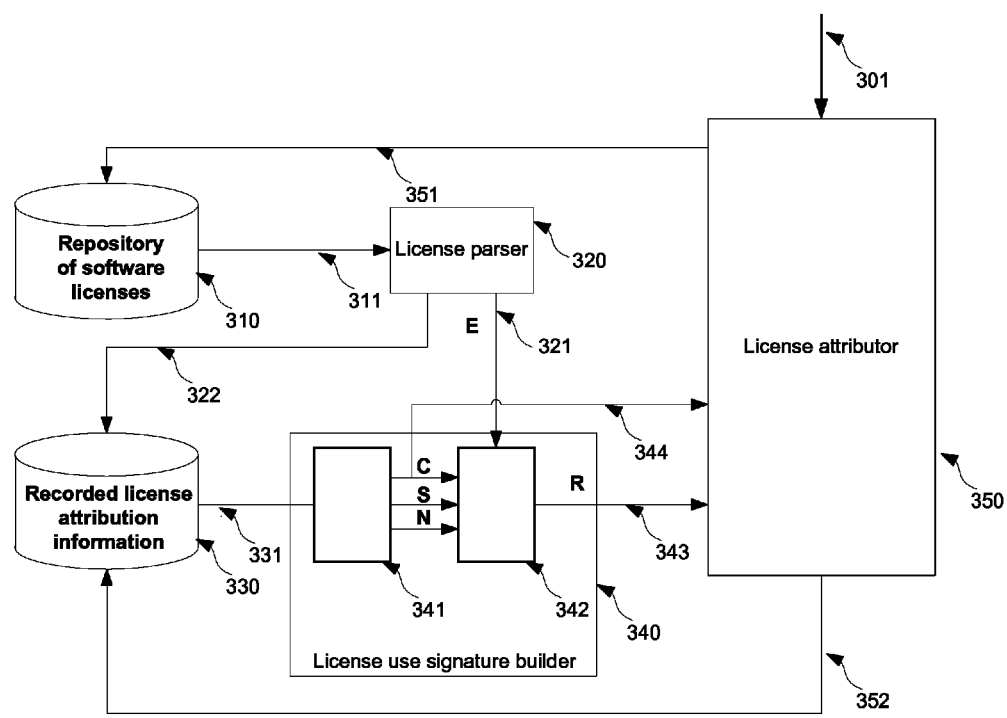
FIG. 3 shows a schematic block diagram of functional elements of certain embodiments.

FIG. 3 shows a schematic block diagram of functional elements of some embodiments. As shown, there is provided a license attributor 350, which receives an instance notification represented by the line 301. On receiving this notification, the license attributor 350 issues instructions 351 to a repository of software licenses 310, to retrieve details of licenses relevant to the software being instantiated. Details of the retrieved licenses 311 are output to a license parser 320, which provides the entitlement value E to the second module of the license use signature builder as described hereafter in message 321, and submits a request 322 to a recorded license attribution information database 330 for historical information for the candidate licenses. This historical use information is passed in message 331 to the license use signature builder 340. A first module 341 of the license use signature builder calculates the values C, S and N as described herein, and passes these to a second module 342 of the license use signature builder which for each license calculates the Residual capacity value (R) according to the calculation $R(n)=E-N\times C\times S$, as described herein. The license use signature builder outputs a set of R values 343 and a set of C values 344 to the License attributor 350. According to this embodiment the license use signature thus comprises R values and C values for each candidate license. The License attributor on receiving this signature selects the best candidate license as described herein according to various embodiments, and updates the recorded license attribution information database 330 using the message 352.

It will be appreciated that the functional elements described with respect to FIG. 3, and correspondingly the steps of the methods described with respect to FIGS. 1 and 2, as well as other embodiments, may be implemented in the form of an entirely hardware embodiment, an entirely software embodiment, or an embodiment including both hardware and software elements. In a preferred embodiment, the invention is implemented in software, which includes but is not limited to firmware, resident software, microcode, etc.

The preceding embodiments outline a situation where some instances have already been assigned to the license in the time frame another instance is to be assigned. Hereafter, an alternative situation is considered wherein a licensing system computes the association between licenses and usage instances as a first step and then, based on the associated instances, calculates the license consumption. Under such circumstances, the R value cannot be computed as far as all the instances have been already associated. This means that the algorithm should calculate R as the historical residual capacity, for example how much capacity remained for a licenses in the previous calculation period. In this variation, after computing the historical R, the algorithm moves to associating consume instances to the licenses. For each session, the algorithm finds a suitable license: if the license is the same that was associated in the previous period, it is assigned without any further calculation (if in the previous day this assignment lead to a compliant license, the result will be the same also today). If the resulting license is not the one used the day before (also for example in case the consume session didn't occur in the previous period), at this point it is useful to consider R and calculate $R-(\text{consume session})*C*S$, thus obtaining R'. The license with the largest R' should be used. If another consume session must be assigned to this license, calculate $R''=R'-(\text{usage session})*C*S$, and so on for each new instance that must be assigned, where "new" means it was not assigned in the previous period.

In this embodiment the protection threshold is especially significant since in this first phase instances are assigned based on statistical parameters computed on historical data to speed up the computations. But at the end of the period it will be useful to calculate the real consumption, making exact calculations. When performing the exact calculation, the system may discover it was too optimistic when assigning instances based on historical data, and so while computation based on historical data indicated no license was overused, in reality, when performing exact calculations, the assignment generates licenses overuse. For this reason a protection factor is desirable, so that even if the results of exact calculations end up being worse than expected, a margin is available avoid overuse.

According to a further embodiment, rather than selecting the license with the lower C and a R higher than 0, the system may select which license has the largest residual capacity, because assigning based on C may have some side effects (for example, a license with a high C and a very low S may be preferable to a license with a low C but very high S).

According to a further embodiment, rather than selecting the license with the lower C and a R higher than 0, the system may select whichever license has a lower product between C and S. This approach provides additional strength to the algorithm because the probability that an instance will consume something is considered together with the cost if consumption occurs, so the probability of the worst case scenario is considered, i.e., the instance consumes, together with the penalty of paying in this worst case scenario, e.g., the mean expected consumption). In such au approach the license use signature for each license may also include the value of S as described herein. By considering both C and S, both the probability of a charge and the "slot price" paid in case it is chargeable are taken into account. The multiplication of these two values will lead to how statistically expensive it would be for the association to a license.

According to a another embodiment, in a case where the system is used to choose among two or more equally eligible licenses, for example two licenses having the same value of C, the system may use one of the alternative methods describe above as a tie-breaker.

Furthermore, embodiments described herein may take the form of a computer program product accessible from a computer-usable or computer-readable medium providing program code for use by or in connection with a computer or any instruction execution system. For the purposes of this description, a computer-usable or computer readable medium may be any apparatus that can include, store, communicate, propagate, and/or transport the program for use by or in connection with the instruction execution system, apparatus, or device.

Figure 4:
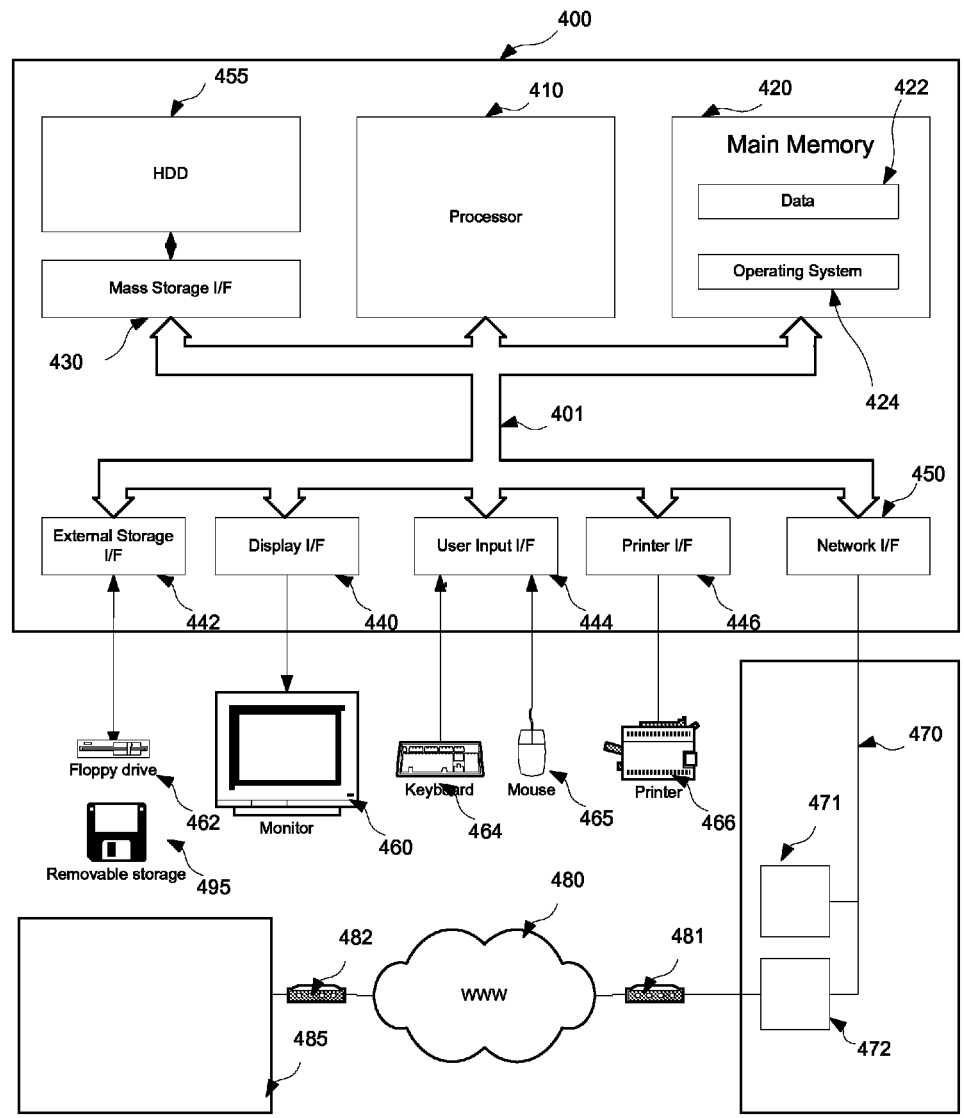
FIG. 4 shows a computer environment suitable for implementing certain embodiments.

FIG. 4 shows a computer environment suitable for implementing embodiments described herein. As shown in FIG. 4, the computer system 400 comprises a processor 410, a main memory 420, a mass storage interface 430, a display interface 440, and a network interface 450. These system components are interconnected through the use of a system bus 401. Mass storage interface 430 is used to connect mass storage devices (e.g., hard disk drive 455) to the computer system 400. One specific type of removable storage interface drive 462 is a floppy disk drive which may store data to and read data from a floppy disk 495, but may other types of computer readable storage medium may be envisaged, such as readable and optionally writable CD-ROM drive. There is similarly provided a User input interface 444 which receives user interactions from interface devices such as a mouse 465 and a keyboard 464. There is also provided a printer interface 446 which may send and optionally receive signals to and from a printer 466.

Main memory 420 in accordance with some embodiments includes data 422, an operating system 424.

The computer system 400 utilizes well known virtual addressing mechanisms that allow the programs of the computer system 400 to behave as if they only have access to a large, single storage entity instead of access to multiple, smaller storage entities such as main memory 420 and HDD 455. Therefore, while data 422 and operating system 424, are shown to reside in main memory 420, those skilled in the art will recognize that these components are not necessarily all completely contained in main memory 420 at the same time. It should also be noted that the term "memory" is used herein to generically refer to the entire virtual memory of computer system 400.

Data 422 represents any data that serves as input to or output from any program in computer system 200. Operating system 424 may be a multitasking operating system known in the industry as OS/400 (OS/400 is a registered trademark of IBM Corporation in the United States, other countries, or both); however, those skilled in the art will appreciate that the spirit and scope of the present invention is not limited to any one operating system.

Processor 410 may be constructed from one or more microprocessors and/or integrated circuits. Processor 410 executes program instructions stored in main memory 420. Main memory 420 stores programs and data that processor 410 may access. When computer system 400 starts up, processor 410 initially executes the program instructions that make up operating system 424. Operating system 424 is a sophisticated program that manages the resources of computer system 400. Some of these resources are processor 410, main memory 420, mass storage interface 430, display interface 440, network interface 450, and system bus 401.

Although computer system 400 is shown to include only a single processor and a single system bus, those skilled in the art will appreciate that a computer system that has multiple processors and/or multiple buses may be used. In addition, the interfaces that are used in the embodiment shown each include separate, fully programmed microprocessors that are used to off-load compute-intensive processing from processor 410. However, those skilled in the art will appreciate that computer systems that simply use I/O adapters to perform similar functions may be used.

Display interface 440 is used to directly connect one or more displays 460 to computer system 400. These displays 460, which may be non-intelligent (i.e., dumb) terminals or fully programmable workstations, are used to allow system administrators and users to communicate with computer system 400. Note, however, that while display interface 440 is provided to support communication with one or more displays 460, computer system 400 does not necessarily require a display 465, because all needed interaction with users and other processes may occur via network interface 450.

Network interface 450 is used to connect other computer systems and/or workstations (e.g., 475 in FIG. 4) to computer system 400 across a network 470. Computer system 400 may be connected to other computer systems and/or workstations in any manner, regardless of whether the network connection 470 is made using present-day analogue and/or digital techniques or via some networking mechanism of the future. In addition, many different network protocols may be used to implement a network. These protocols are specialized computer programs that allow computers to communicate across network 470. (Transmission Control Protocol/Internet Protocol (TCP/IP) is an example of a suitable network protocol, for example over an Ethernet network. As shown, the network 470 connects the system 400 to two further devices 471 and 472, which may be other computer systems similar to that described above, or other network capable devices such as printers, routers etc. In the present example, network device 472 is a local server, which is connected via a modem 481 to a public network 480 such as the word wide web (WWW). Using this public network 480 a connection to a remote device or system 485 may be established.

At this point, it is important to note that while the embodiments described herein have been and will continue to be described in the context of a fully functional computer system, those skilled in the art will appreciate that the embodiments described herein are capable of being distributed as a program product in a variety of forms, and that the embodiments described herein apply equally regardless of the particular type of signal bearing media used to actually carry out the distribution. Examples of suitable signal bearing media include: recordable type media such as CD-ROM (e.g., 495 of FIG. 4), and transmission type media such as digital and analogue communications links.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While the embodiments described herein have been described in the context of attributing software licenses, it will be appreciate that they are capable of handling the attribution of any activity which may require selection from a number of different license agreements.

According to a further embodiment, for environments where there exists a choice of software licenses offering a variety of different terms and restrictions, there is described a method of selection a preferred license on the basis of historical use patterns. Preferably, a new instance is attributed to whichever license has the lowest probability that an arbitrary instance will be chargeable according to that license (C), and where the probability for that license that a new instance will be chargeable according to that license (C) multiplied by the average number of slots consumed per instance (S) for that license multiplied by the number of instances already attributed to that license during the present time frame is less than the entitlement value for that license.

What is claimed is:

1. A system for license management, the system comprising:
   a license repository storing a plurality of licenses relevant to a particular software application;
   a computer readable storage medium storing recorded license attribution information; and
   a processor and logic integrated with the processor, executable by the processor, or integrated with and executable by the processor; the logic causing the processor to:
   arrange entitlement slots under the plurality of licenses stored to the license repository, each entitlement slot allowing use of an instance of the software application during a particular time frame;
   determine a license use signature from the recorded license attribution information stored to the computer readable storage medium by causing the processor to calculate a residual capacity value (R) for each license of the plurality of licenses according to $E-N \times C \times S$, where E is an individual entitlement value for each license of the plurality of licenses, N is a number of slot consuming instances to which slots are attributed in a given time frame, C is a probability for each license that an arbitrary instance will be chargeable according to that license, and S is an average number of slots consumed per instance;
   receive a notification of an instance not attributed to a license;
   assign an individual entitlement value (E) to each license of the plurality of licenses, each entitlement value (E defining a maximum number of entitlement slots attributable to a particular license during a time frame;
   attribute the non-attributed instance to one of the plurality of licenses as a function of the license use signature by causing the processor to:
   determine from the recorded license attribution information stored to the computer readable storage medium the probability (C) for each of the plurality of licenses that an arbitrary instance is chargeable according to that license;
   determine from the recorded license attribution information stored to the computer readable storage medium for each of the plurality of licenses the average number of slots consumed per instance (S); and
   attribute the non-attributed instance to a license selected from a group consisting of: a license which has a lowest probability (C) that an arbitrary instance is chargeable according to that license, a license which has a lowest C and a residual capacity (R) of greater than 0, a license which has a lowest number of slots consumed per instance (S), a license which has a largest residual capacity (R), and a license which has a lowest product of C multiplied by S,
   wherein each instance of the software application is configured to consume an independent number of the entitlement slots in a range from 0 entitlement slots to the maximum number of entitlement slots attributable to the particular license, and
   wherein each entitlement value (E) is calculated as being greater than a probability (C) for each of the plurality of licenses that an arbitrary instance is chargeable according to a particular license multiplied by an average number of slots consumed per instance (S) for the particular license multiplied by a number of instances already attributed to the particular license during the time frame (I), such that E>C*S*I.

2. The system as recited in claim 1, wherein the license use signature represents a plurality of license use patterns, and wherein the logic causing the processor to attribute the non-attributed instance to one of the plurality of licenses further causes the processor to:
   select a first license from the plurality of licenses that ensures compliance with terms of all of the plurality of licenses; and
   attribute the non-attributed instance to the first license.

3. The system as recited in claim 1, wherein the logic causing the processor to determine the probability (C) for each of the plurality of licenses that an arbitrary instance is chargeable according to that license further causes the processor to calculate the probability (C) for each of the plurality of licenses that an arbitrary instance is chargeable according to that license as an average across all time frames in a historical record of a ratio between a number of slots consumed on each time frame comprised in the historical record (dC) and a number of instances to which slots are attributed in a same time frame (dN), such that C=AVG(dC/dN).

4. The system as recited in claim 1, wherein the logic causing the processor to determine the average number of slots consumed per instance (S) further causes the processor to the calculate the average number of slots consumed per instance (S) as an average across all time frames in a historical record of a ratio between a number of instances to which slots are attributed in each time frame (dN) and a total number of instances attributed to that license in a same time frame (dN), such that S=AVG(dN/dL).

5. The system as recited in claim 1, wherein the logic further causes the processor to multiply each license's entitlement value (E) by a protection threshold value (P) in order to reduce each license's entitlement value (E) to become less than a strict maximum predefined by each license.

6. The system as recited in claim 1, wherein the time frame is one day.

7. The system as recited in claim 1, wherein the notification is generated by an operating system on which the application is running.

8. The system as recited in claim 1, wherein a number of slots consumed by an instance (S) is related to a number of processors on which the instance is being executed.

9. The system as recited to claim 1, wherein the logic further causes the processor to invalidate an attributed license in response to a hardware configuration change or an organizational hierarchy change for an operating system hosting the software application.

10. The system as recited in claim 1,
    wherein a number of slots consumed by an instance (S) is equal to a number of processors on which the instance is being executed,
    wherein each license's entitlement value (E) is capped by a strict maximum predefined by each license,
    wherein the logic causing the processor to determine the probability (C) for each of the plurality of licenses that an arbitrary instance is chargeable according to that license further causes the processor to calculate the probability (C) for each of the plurality of licenses that an arbitrary instance is chargeable according to that license as an average across all time frames in a historical record of a ratio between a number of slots consumed on each time frame comprised in the historical record (dC) and a number of instances to which slots are attributed in a same time frame (dN), such that C=AVG(dC/dN),
    wherein the logic causing the processor to determine the average number of slots consumed per instance (S) further causes the processor to the calculate the average number of slots consumed per instance (S) as an average across all time frames in a historical record of a ratio between a number of instances to which slots are attributed in each time frame (dN) and a total number of instances attributed to that license in a same time frame (dN), such that S=AVG(dN/dL),
    wherein the license use signature represents a plurality of license use patterns,
    wherein the logic further causes the processor to:
        determine a subset of licenses from the plurality of licenses that are non-consuming licenses, a non-consuming license being a license that has a cost to a user that is independent of an amount of usage of the software application; and
    indicate the non-consuming licenses as consuming 0 entitlement slots, and
    wherein the logic causing the processor to attribute the non-attributed instance to one of the plurality of licenses further causes the processor to:
        select a first license from the plurality of licenses that ensures compliance with terms of all of the plurality of licenses; and
        attribute the non-attributed instance to the first license.

* * * * *